US008645539B2

(12) United States Patent
McCarthy et al.

(10) Patent No.: US 8,645,539 B2
(45) Date of Patent: *Feb. 4, 2014

(54) DOMAIN NAME RESOLUTION RESOURCE ALLOCATION

(71) Applicant: Limelight Networks, Inc., Tempe, AZ (US)

(72) Inventors: Nils H. McCarthy, Seattle, WA (US);
Brad B. Harvell, Chandler, AZ (US);
Lee A. Stafford, Phoenix, AZ (US);
Gary S. Baldus, Scottsdale, AZ (US);
Michael M. Gordon, Paradise Valley, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/732,819

(22) Filed: Jan. 2, 2013

(65) Prior Publication Data

US 2013/0219020 A1    Aug. 22, 2013

Related U.S. Application Data

(63) Continuation of application No. 13/462,899, filed on May 3, 2012, now Pat. No. 8,380,851, which is a continuation of application No. 12/726,840, filed on Mar. 18, 2010, now Pat. No. 8,195,837, which is a continuation of application No. 11/530,790, filed on Sep. 11, 2006, now Pat. No. 7,707,314, which is a continuation-in-part of application No. 11/284,493, filed on Nov. 21, 2005, now abandoned.

(51) Int. Cl.
*G06F 15/173* (2006.01)

(52) U.S. Cl.
USPC .......................................... 709/225; 709/217

(58) Field of Classification Search
USPC .................................................. 709/217, 225
See application file for complete search history.

(56) References Cited

U.S. PATENT DOCUMENTS

2002/0152309 A1 * 10/2002 Gupta et al. .................. 709/225

FOREIGN PATENT DOCUMENTS

| EP | 0817020 | 7/1998 |
| WO | 9850863 | 11/1998 |
| WO | 0139003 | 5/2001 |

OTHER PUBLICATIONS

Cheung et al. "Dynamic DNS for Load Balancing." Proceedings of the 23rd International Conference on Distributed Computing Systems Workshops, May 2003, 4 pages.
Extended European Search Report mailed on Jun. 3, 2013 in European Patent Application No. 06826759, 12 pages.
Moon et al. "Dynamic load balancing method based on DNS for distributed web systems." Proceedings of the 6th International Conference on Electronic Commerce, Oct. 2004, 10 pages.

* cited by examiner

*Primary Examiner* — David Lazaro
*Assistant Examiner* — Marie Georges Henry
(74) *Attorney, Agent, or Firm* — Kilpatrick Townsend & Stockton LLP

(57) ABSTRACT

A content delivery network (CDN) for delivering content over the Internet is disclosed in one embodiment. The CDN includes a domain resolution service (DNS) server, caching servers and an Internet interface. The caching servers correspond to a plurality of addresses. The DNS server receives two domain resolution requests corresponding to a same domain and produces two different DNS solutions, each corresponding to a subset of caching servers. The interface receives domain resolution requests, including the two domain resolution requests, and transmits DNS solutions, including the two DNS solutions. The processing power is generally matched between the two DNS solutions.

20 Claims, 9 Drawing Sheets

DOMAIN NAME RESOLUTION RESOURCE ALLOCATION

CROSS-REFERENCES TO RELATED APPLICATIONS

This application is a continuation application of U.S. patent application Ser. No. 13/462,899 filed May 3, 2012, which claims the benefit of and is a continuation of U.S. patent application Ser. No. 12/726,840 filed Mar. 18, 2010, which is a continuation of U.S. patent application Ser. No. 11/530,790 filed on Sep. 11, 2006, which is a continuation-in-part of co-pending U.S. patent application Ser. No. 11/284,493 filed on Nov. 21, 2005. All of the above-listed applications are hereby expressly incorporated by reference in their entirety for all purposes.

BACKGROUND

This disclosure relates in general to content delivery and, more specifically, but not by way of limitation, to domain name service (DNS) resolution.

A content delivery network (CDN) is used by many web sites to deliver content more efficiently. The CDN may host, mirror and/or cache the content as well as deliver it to a requesting party. A web site or origin server is linked to the CDN such that some or all content can be sourced from the CDN rather than the web site. This process of fulfilling a link through a CDN is usually transparent to the user.

Singlecasting of large events can be difficult for CDNs to deliver efficiently. CDNs deliver content objects such as files or streams to tens of thousands of recipients in a short period of time. Serving resources can be overwhelmed by these large events. Where a point of presence (POP) or individual servers saturate, a user can experience inadequate quality of service (QoS). To avoid these bottlenecks, CDNs generally overbuild their serving resources and POPs. Overbuilding is undesirable, as it is inefficient and can result in increased expense and complexity that is not needed during normal operating conditions.

A domain name service (DNS) is used to resolve the IP address or group of IP addresses from where an object or stream should be sourced for delivery to a recipient. Users' local DNS recursors participate in a series of delegations to resolve the actual IP address of the server that will source the data. Through the delegation process, the request for data is routed to the server, which could be one of a number of servers that could source the data.

One or more alternative server addresses can be provided during the DNS resolution process. Any of the alternative servers can be used to provide the data associated with the requested domain. Where a small number of server addresses is provided, and/or where each user DNS recursor is given a DNS solution with the same server listed first, servers can overload and provide poor QoS. One solution to this problem is "round-robin DNS", where IP addresses given in each DNS resolution are the same, but the order of the IP addresses could be varied for each DNS solution, with the goal of more evenly distributing the content requests across the servers.

Where a larger number of server addresses is desirable, there are limits, typically encountered at user-network firewalls and other security boundaries, on the size of a DNS solution packet, and therefore on the number of IP addresses that can be included in such a solution. A typical limit could be in the range of 16 to 20 IP addresses. There are two methods known in the art that are usually deployed to work around this limit and enable utilization of more servers than the limit of the DNS solution packet size. One method is to use a load balancing switch to virtualize the IP addresses. In this method, a small number of logical IP addresses is returned in the DNS solution packet; content requests are intercepted by the load balancing switch; and the switch maps those requests to a greater (often far greater) number of physical IP addresses corresponding to physical servers. The switch is a "load balancing" switch because another of its functions, besides enabling the virtualization of server addresses, is to balance loads across servers, which among other effects, normally makes round-robin DNS unnecessary (because even if all content requests came to a single logical IP address, the switch can distribute the load among the physical IP addresses). Thus, in one example of this scenario, 16 logical IP addresses are returned in each DNS solution; all content requests are directed to one of these 16 logical IP addresses; the load balancing switch translates the 16 logical IP addresses to 60 physical server IP addresses; and the switch balances the loads across the 60 servers.

A second method of solving this DNS solution packet limit problem is to divide the content site into multiple, smaller logical sites, by using hostnames for each portion of the site (a "hostname" is the portion of the URL to the left of the website name, e.g., in the URL img.foo.com, "img" would be the hostname). As an example, if foo.com requires more than the limited number of servers that could be returned in a DNS solution packet, it could be divided into part-A.foo.com, part-B.foo.com, and part-C.foo.com. When DNS resolutions are requested, different server addresses can be provided for each hostname, thereby (in this example), tripling the number of servers that can be used to serve the content. When using this method, round-robin DNS is still useful, because changing the order of the IP addresses presented in the DNS solution for part-A.foo.com can help to more evenly distribute the content requests across the servers. Both of these methods, however, have limitations.

BRIEF DESCRIPTION OF THE DRAWINGS

The present disclosure is described in conjunction with the appended figures.

Figure 1A:
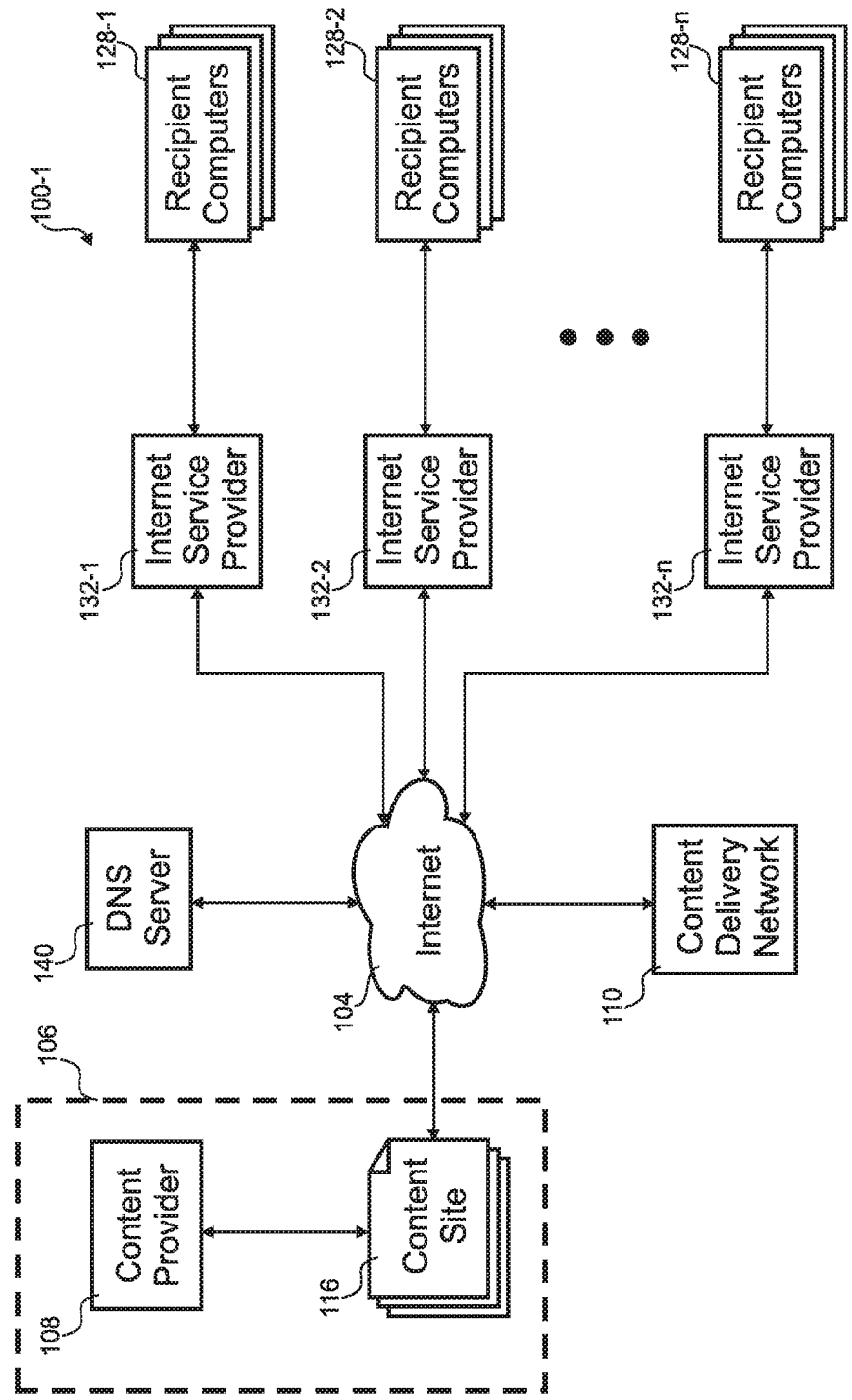
FIGS. 1A-1D are block diagrams of embodiments of a content system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

With reference to FIG. 1A, an embodiment of a content system 100 is shown where a content originator 106 offloads the delivery of the content objects to a content delivery network (CDN) 110. In one embodiment, the content system 100 can dynamically adjust the allocation of server resources to content objects or streams to achieve a more optimal level of resources at any given level of demand. The content originator 106 produces content object. Included in the content originator 106 are a content provider 108 and a content origin site or web site 116. A content object is any content file or content stream and could include, for example, software, audio, video, pictures, data, and/or text. The content object could be live, delayed or stored. The content site 116 can be located within the infrastructure of the content provider 108, within a CDN 110 and/or at an alternative location. Throughout the specification, reference may be made to a content object, content stream and/or content file, but it is to be understood that those terms could be used interchangeably wherever they may appear.

Many content providers 108 use a CDN 110 to deliver the content objects to customers or recipients. When a content object is requested by a recipient, the CDN 110 retrieves the content object from the content provider 108. Alternatively, the content provider 108 may directly provide the content object to the CDN 110, i.e., in advance of the first request. The CDN 110 then provides the content object to the recipient. The content provider 108 typically pays the CDN 110 for the delivery of the content object. In other embodiments, the CDN 110 could be captive or associated with the content provider 108 such that payment is not performed.

The content originator 106 is the source or re-distributor of content objects. The content site 116 is an Internet site accessible directly or indirectly via the Internet by the recipient computer 128. In one embodiment, the content site 116 could be a web site where the content is viewable with a web browser. In other embodiments, the content site 116 could be accessible with application software other than a web browser and/or accessible from devices other than personal computers. Links on the content site 116 and/or links to individual content objects are structured to allow delivery through one or more CDNs 110. The links may be rewritten before a web page is rendered or after a link is activated by using a redirect.

The recipient computer 128 receives the content object and processes it for the recipient. The recipient computer 128 could be a personal computer, media player, handheld computer, Internet appliance, phone, or any other device that can receive content objects. In some cases, the recipient computer 128 can be a number of computing devices that may be networked together.

Each recipient computer or other device 128 is associated with an Internet service provider (ISP) 132. Each ISP 132 provides Internet connectivity to one or more recipient computers or other devices 128. The ISP 132 may provide DNS caching in addition to any performed by the recipient computer or other device 128 and/or routers, gateways, or applications. When a DNS solution is provided to any DNS cache a time-to-live period indicates when the particular solution is no longer to be used, such that a new DNS solution is requested to allow resolving a particular domain. A recipient computer or other device 128 requests and accepts the content objects for realization to the recipient. The CDN 110 may be able to determine the particular ISP 132 associated with a particular recipient computer 128.

The content system 100 also includes a domain name service (DNS) server 140, which is sometimes referred to as a "name server." Resolving a particular address for a particular server that would source a particular content object is part of what the DNS server 140 allows.

Figure 1B:
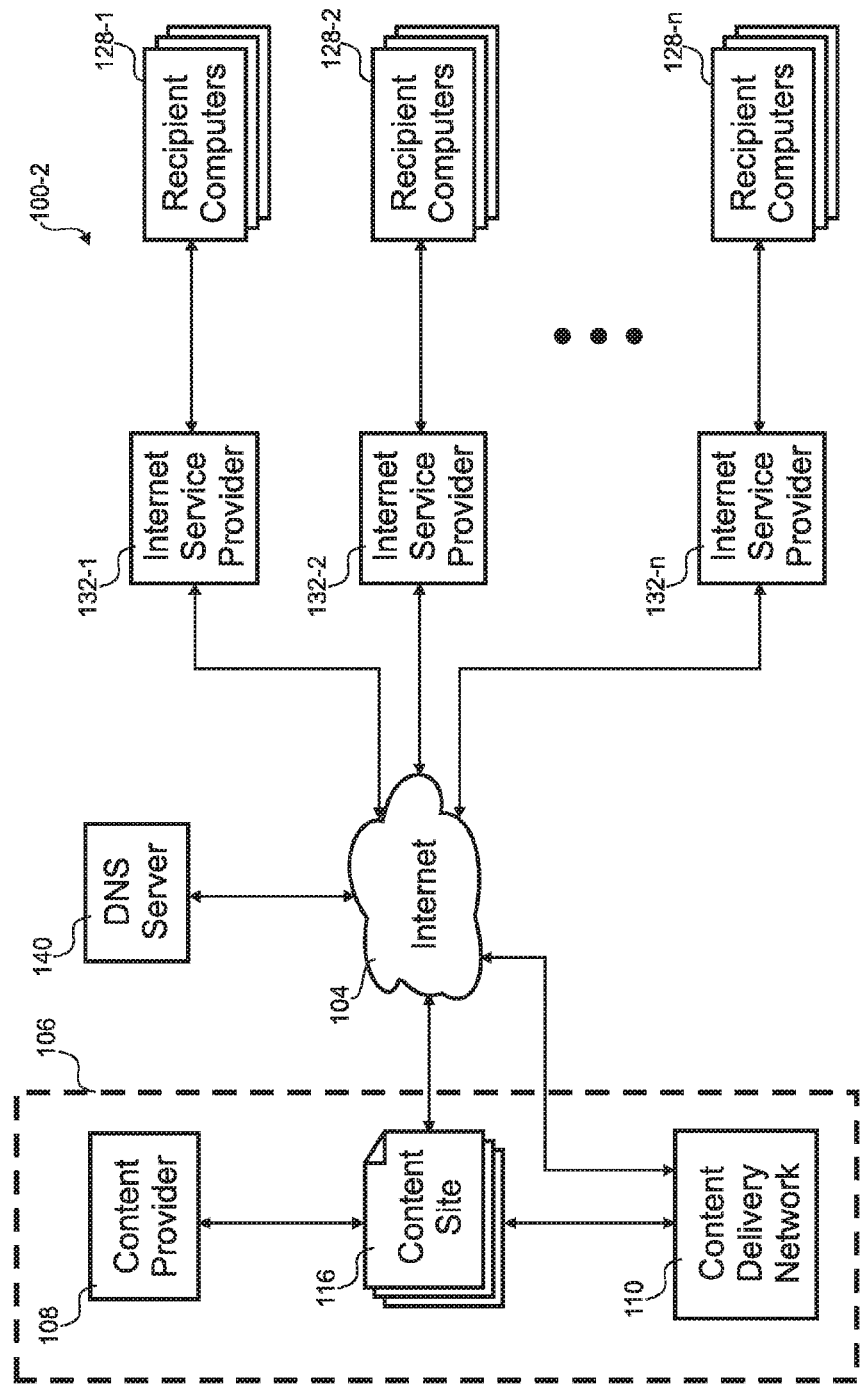

With reference to FIG. 1B, another embodiment of the content system 100-2 is shown where a content originator 106 offloads the delivery of the content objects or streams to a captive CDN 110-1. In the embodiment of FIG. 1A, the CDN 110 is a third party with respect to the content originator 106. In this embodiment, the captive CDN 110 is associated with the content originator 106 and selectively used to deliver content objects. For a captive CDN 110, the functions of the CDN 110 could be combined with and/or divided from other functions of the content originator 106. Portions of the captive CDN 110 could be integrated into the content provider, for example, or vice versa.

Figure 1C:
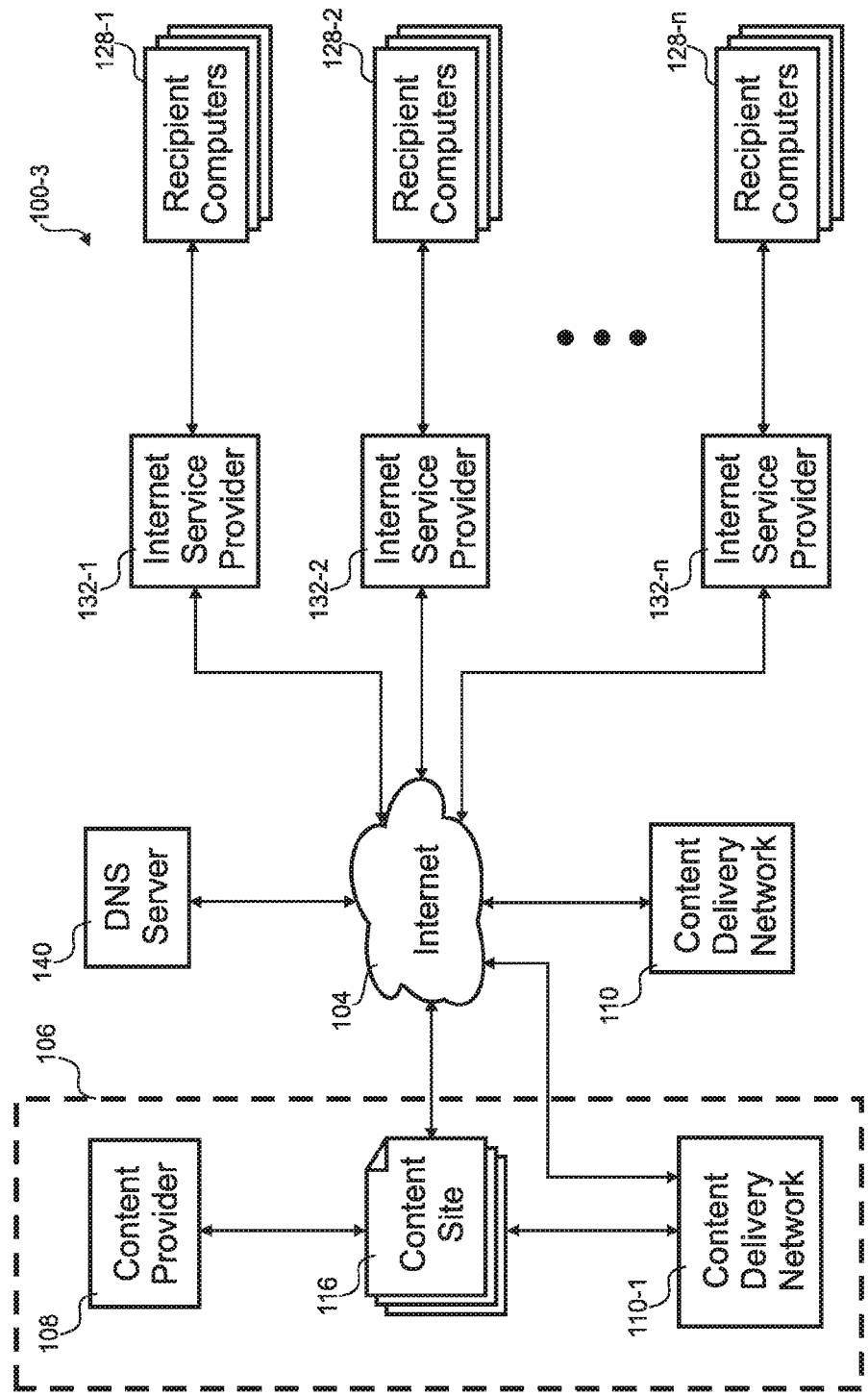

Referring next to FIG. 1C, yet another embodiment of the content system 100-3 is shown where a content originator 106 can choose to offload the delivery of the content objects or streams to either a captive CDN 110-1 or an external CDN 110-2. Routing algorithms are used to choose between the two CDNs 110. Various domains of the content originator 106 could be divided between the two or more CDNs 110. For example, a domain assigned to an external CDN 110-2 such that all requests were serviced from that CDN 110-2, while other domains are serviced by the captive CDN 110-1.

Figure 1D:
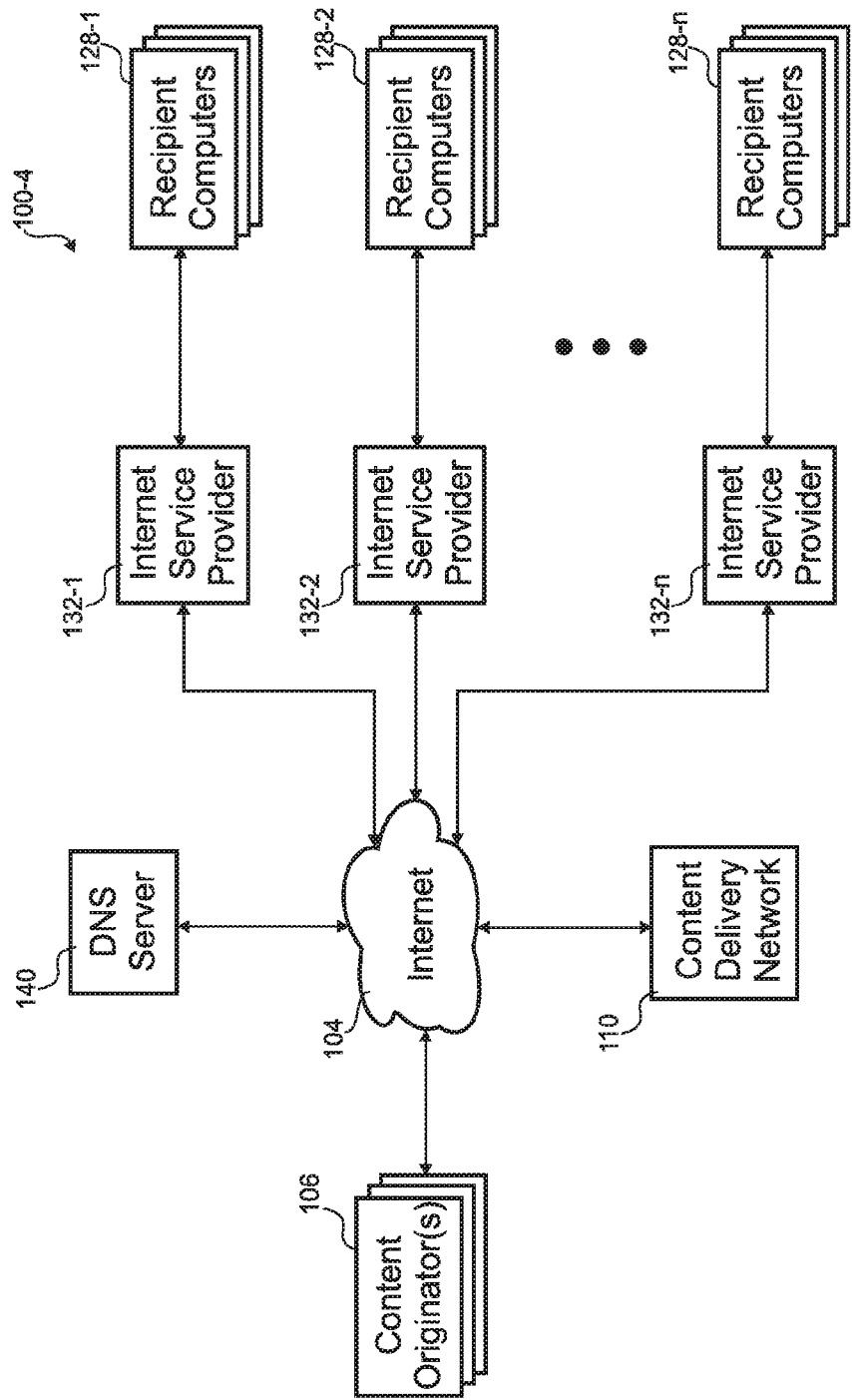

With reference to FIG. 1D, still another embodiment of the content system 100-4 is shown where multiple content originators 106 are shown. Typically, an external CDN 110 operates with multiple domains for the multiple content originators 106. Embodiments with a captive CDN 110 may also have a number of domains that are associated with the associated content originator 106. The DNS server 140 resolves domains of the content originators 106 into server IP addresses.

Figure 2:
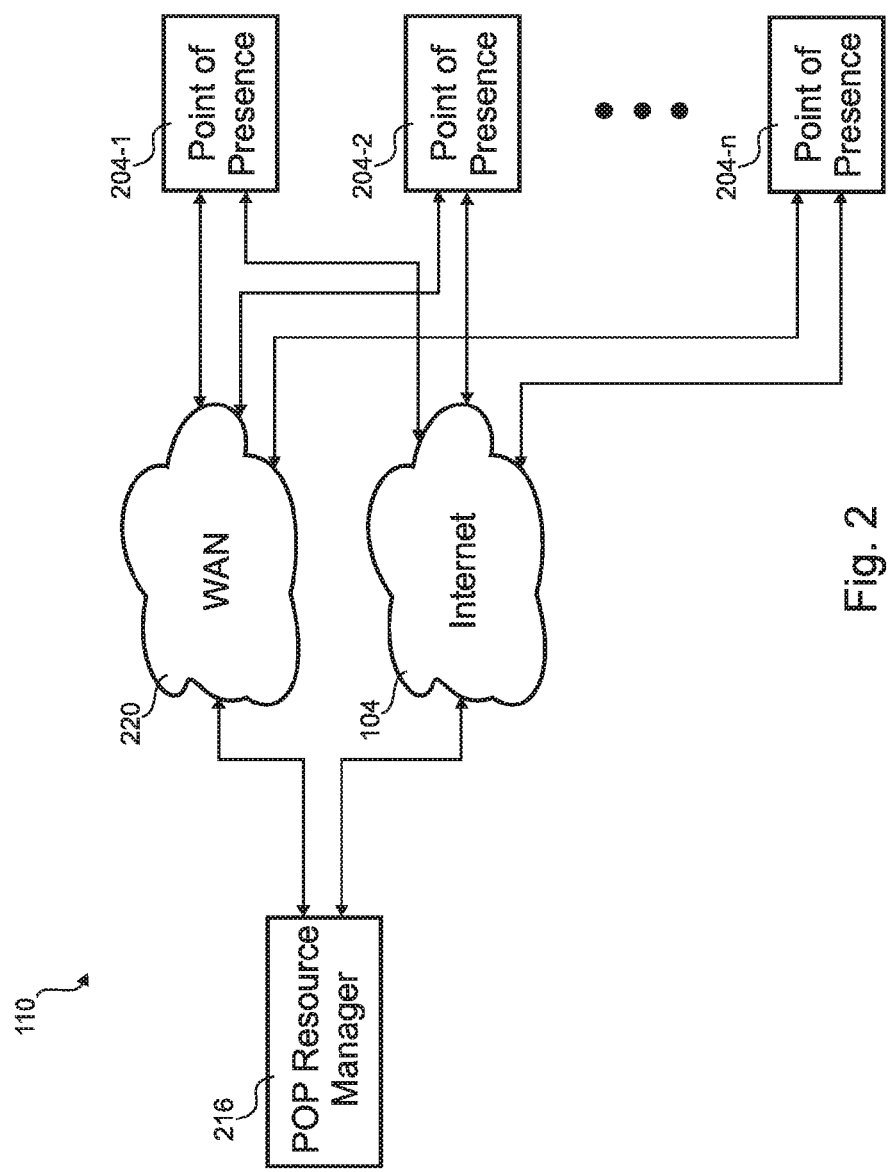
FIG. 2 is a block diagram of an embodiment of a content delivery network (CDN)

Referring next to FIG. 2, a block diagram of an embodiment of a CDN 110 is shown. The CDN 110 could be captive or external in this embodiment. A number of Points of Presence ("POPs") 204 are associated with the CDN 110 and could source multiple domains. Some domains may be served by only certain POPs 204 unless the original POP(s) 204 become(s) overwhelmed. Generally, the POPs 204 are geographically dispersed across the Internet.

Content originators 106 can be manually assigned to one or more POPs 204, or could be assigned to one or more POPs 204 automatically according to a determination by an automated POP resource manager 216. The POP resource manager 216 function could be located at one site or distributed to multiple sites, including to every POP 204 in the CDN. The server resources, capacity, and activity of POPs 204 may be taken into account during content originator 106 assignment in some embodiments. As the server resources at a POP 204 become fully assigned and or as activity, or a specific subset of activity, at the POP 204 rises to a level that exceeds defined thresholds, the POP resource manager 216 can help the high activity POP 204 provide DNS solutions that include content server resources from other POPs 204.

A WAN 220 allows communication among the POPs 204 and between the POPs 204 and the POP resource manager 216. The WAN 220 can transport information faster than the Internet 104 in many instances. Server availability and health checks (operating characteristics), as well as activity levels associated with specific content originators 106, content objects, or domains can be communicated between the POPs 204 and/or monitored by the POP resource manager 216 by way of the WAN 220. When one POP 204 communicates with another POP 204, the WAN 220 can be utilized for this communication. For example, one POP 204 could determine activity levels or resource utilization of other POPs 204 by direct communication or by getting a report from the POP resource manager 216 or POP resource managers 216 in other POPs 204.

Figure 3:
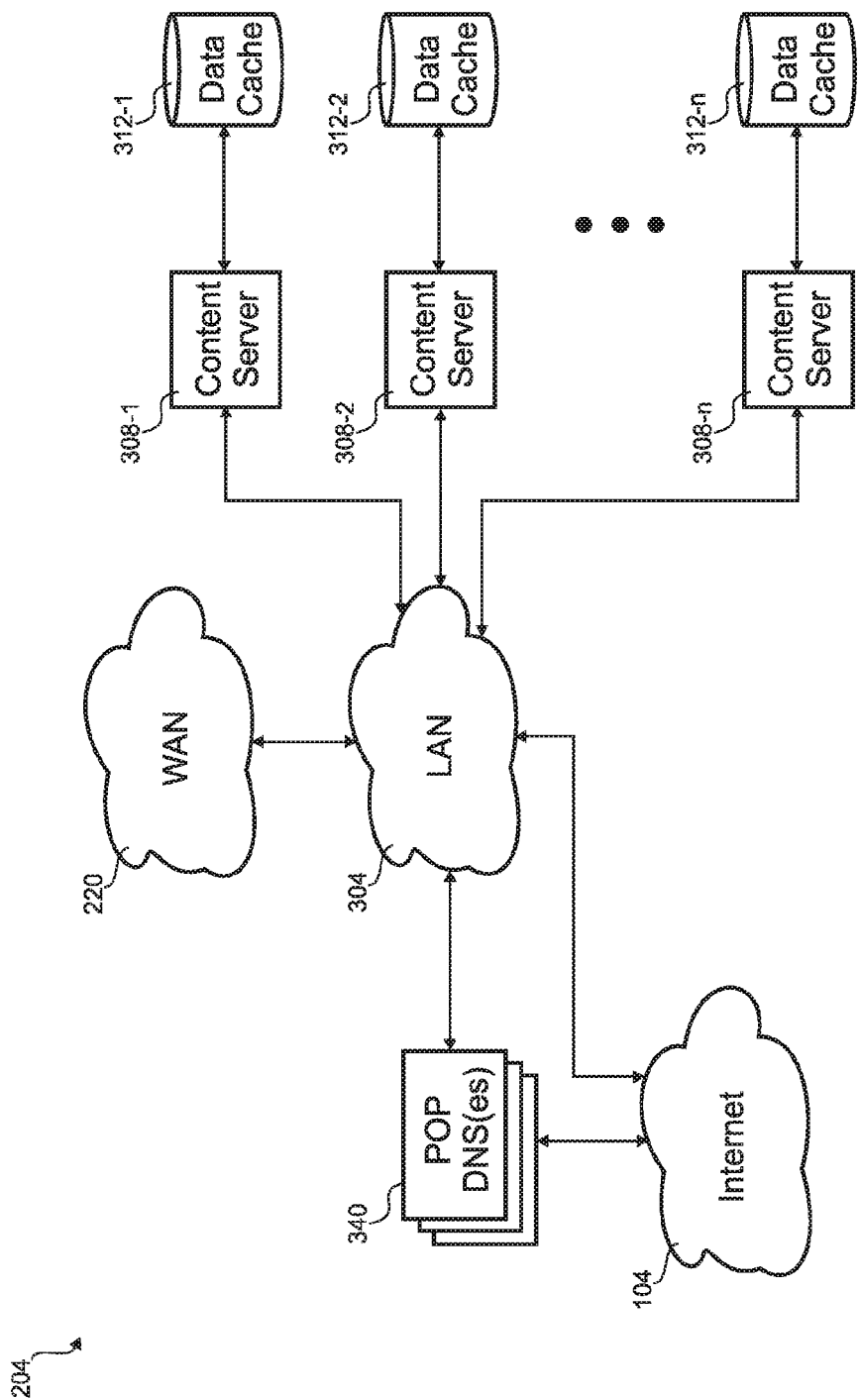
FIG. 3 is a block diagram of an embodiment of a point of presence (POP)

With reference to FIG. 3, a block diagram of an embodiment of a POP 204 is shown. The POP 204 sources the content objects from any number of content servers 308. Each content server 308 has a data cache 312 in this embodiment, but other content servers 308 could host domains without caching such that content objects are not dynamically associated or disassociated with the content server 308. Where the content server 308 doesn't have a requested content object stored on the data cache 312, the content object could be requested from another content server 308 in the POP 204, in another POP 204 or the origin server of the content originator 106. After the request, the content object is stored on the data cache 312 until inactivity or other caching algorithms push the content object from the data cache 312.

The POP 204 uses at least three types of networks in this embodiment, specifically, the Internet 104, a WAN 220 and a LAN 304. Generally, the LAN 304 is for communication within the POP 204, the Internet 104 is for receiving domain resolution requests and content object requests and the WAN 220 is for communication within the CDN 110. The WAN 220 could be implemented via the Internet, using such techniques as tunneling or virtual private networking, or simply by utilizing standard Internet communications protocols. Where a particular POP 204 doesn't have a requested content object stored, it may be requested from another POP 204 over the WAN 220. Should the missing content object not be stored on another POP 204, the content object can be requested from the content originator 106.

A POP DNS server 340 receives the domain resolution requests. The POP DNS 340 resolves a particular domain to a particular IP address or group of IP addresses in a DNS solution, where each IP address is for a server(s) that can source the content object. The POP DNS server 340 returns IP addresses of one or more content servers 308 in this or another POP 204 of the CDN 110. A particular DNS solution typically provides a number of content server IP addresses available to serve a particular domain along with a time-to-live for the DNS solution (e.g., 2 minutes, 5 minutes, 10 minutes, 30 minutes, 1 hour, 5 hours, etc.). A particular IP address will generally correspond to a single server, but may correspond to a group of servers accessible from that IP address.

During the DNS resolution, the POP DNS server 340 determines the appropriate number of content servers 308 to be assigned based on the content originator 106, the domain being resolved, the specific content object requested, and/or other factors. The appropriate number of content servers 308 to use in a particular DNS solution in various embodiments is based on the total number of content servers 308 available at the POP 204 or alternatively at the POP 204 and one or more of the other POPs 204, the overall level of activity associated with the content originator 106, the particular domain being resolved, and/or the specific content object requested.

In one embodiment, the appropriate number of content servers 308 is the smallest number, or smallest choice of specific number from a list of values such as 4, 8, 16, etc., that is deemed to be sufficient to service the overall level of activity associated with the content originator 106, the domain being resolved, or the specific content object requested, such that the number of content servers 308 is sufficient and that the storage of the content object(s) and/or utilization of the content servers 308 is concentrated on a specific number of all of the content servers 308 in the POP 204. Typically, the concentration on a specific number of all the content servers 308 is less than all available at the POP 204. As the overall level of activity associated with the content originator 106, the domain being resolved, or the specific content object requested changes, the number of content servers 308 may change either smoothly (e.g., one at a time) or in steps (e.g., four at a time). The appropriate number of content servers 308 may be determined periodically and stored in a table for look-up at each DNS resolution or may be dynamically calculated for each DNS resolution. As the appropriate number of content servers 308 is determined, the POP DNS server 340 maintains a list of that number of specific content servers 308, such that the specific content server 308 IP addresses will be returned in that and future DNS resolutions associated with that specific content originator 106, domain being resolved, or specific content object. In this way, the DNS solutions can be assigned to the same specific group of servers or a subset from that group.

The POP DNS server 340 also monitors each content server's 308 availability and health, typically by simulating a content object request and measuring the server's response time to determine if the server is operating properly. If the POP DNS server 340 determines that a specific content server 308 has failed or is not operating properly, the POP DNS server 340 can permanently or temporarily delete that specific content server 308 from all lists of specific content servers 308 on which it appears, and replace it on each list of content servers 308 with another content server 308, if one is available. Different lists may receive different replacement content servers 308. Based upon these analyses and steps, for example, more content server IP addresses could be provided in response to a given DNS resolution request; more content server IP addresses could be selected from a universe of more content servers for that particular object; and/or IP addresses of inoperative or poorly-operating content servers could be avoided.

In finally providing a DNS resolution (i.e., a DNS solution set), the POP DNS server 340 does not necessarily return all the IP addresses for all content servers 308 that are on the list for a given DNS resolution. In many cases, a subset of the IP addresses from the list is returned, for example, in order that the data size (e.g., IP packet size) of the DNS solution is not larger than is desirable. In cases where the POP DNS server 340 determines that it will return a DNS solution set that is less than all of the IP addresses on the list, the selection of IP addresses from the list can be done randomly, by rotating solutions through the list in round robin fashion, or can be based on other criteria, such as server load level. Once the DNS solution set is determined, the sequence of the IP addresses that is returned will be randomized or "shuffled" in one embodiment. Each time a DNS resolution is performed for a given content originator 106, domain, or specific content object in other embodiments, the sequence of the IP addresses may be varied in some other fashion, or may not be varied at all.

Each POP 204 can have multiple POP DNS servers 340. In one embodiment, each POP DNS server 340 can perform all of the requisite POP DNS server 340 functions during domain resolution, such that the POP DNS server 340 can complete the entire DNS resolution process without delegating or assigning any of the DNS resolution process to another POP DNS server 340. In other words, when a POP DNS server 340 is used, that POP DNS server 340 handles a given domain name resolution request from start to finish once received. If there is more than one POP DNS server 340 at a given POP 204, the various POP DNS servers 340 can be allocated to subsets of the domains served in this embodiment, with a degree of overlap that provides redundancy in the event that a specific POP DNS server 340 fails. In other embodiments, DNS resolution requests can be distributed randomly among the POP DNS server 340s in the POP 204, in a round-robin fashion or according to some other distribution scheme, or there can be a combination of domain assignments and random or round-robin distribution of requests. The POP DNS servers 340 in a given POP 204 are synchronized and work in concert to share the DNS resolution request load for the POP 204 in this embodiment. The POP DNS servers 340 in multiple POPs 204 may also be synchronized and work in concert. For redundancy, the number of POP DNS servers 340 is two or more in one embodiment, but is typically greater than two to improve QoS in some embodiments.

Content object requests are ultimately served by a content server 308 associated with an IP address presented in the DNS solution to the recipient computer 128. The ISP 132 and/or recipient computer 128 can direct a content object request to any content server 308 IP address in the DNS solution. The chosen content server 308 provides the content object to the recipient computer 128. The content server 308 can be a single server or group of servers associated with the IP address.

In one embodiment, the DNS solution is limited to x content server IP addresses. A particular domain, content originator and/or content object is allocated a number of particular content servers 308, y. The allocation is dependent on the activity level associated with the domain, content originator and/or content object and, optionally, the associated service level. Allocation may be increased by additional allocation of one or more content servers. Those y content servers 308 may be more or less than x. Where y is less than x, all y content servers 308 are used in each DNS solution. Where a particular allocated content server 308 becomes unhealthy, poorly-operating, or utilized beyond a threshold, it can be deleted from the allocation, and another content server 308, if available, could be allocated in its place. The POP DNS 340 also knows the "starting point" for server allocations, and knows which servers have the appropriate resources and/or capabilities available, and can match these to those needed for a particular domain prior to allocation. This embodiment allocates based upon domain, but other embodiments could allocate based upon content originator or content object.

Table I shows allocation of twelve content domains among twelve content servers 308 for a particular POP 204. Some of the domains are allocated 4, 8 or 12 content servers 308 in this embodiment. Allocation is staggered for a particular domain such that the content servers 308 serving one domain are unlikely to be all of the content servers 308 for another domain.

TABLE I

Server Allocation Example

| Domain | Allocated Servers |
|---|---|
| ACME.org | $y_1, y_2, y_3, y_4$ |
| ABC.eu | $y_3, y_4, y_5, y_6$ |
| XYZ.com | $y_5, y_6, y_7, y_8, y_9, y_{10}, y_{11}, y_{12}$ |
| AAA.tv | $y_7, y_8, y_9, y_{10}$ |
| ZZZZZ.in | $y_9, y_{10}, y_{11}, y_{12}$ |
| FOO.iq | $y_1, y_2, y_3, y_4, y_5, y_6, y_7, y_8, y_9, y_{10}, y_{11}, y_{12}$ |
| AQME.com | $y_1, y_2, y_3, y_4$ |
| AABBCC.cn | $y_1, y_2, y_3, y_4, y_5, y_6, y_7, y_8$ |
| JONSMITH.net | $y_5, y_6, y_7, y_8$ |
| FOOFOO.org | $y_7, y_8, y_9, y_{10}$ |
| EXAMPLE.biz | $y_1, y_2, y_{11}, y_{12}$ |
| USPPC.gov | $y_1, y_2, y_3, y_4, y_5, y_6, y_7, y_8, y_9, y_{10}, y_{11}, y_{12}$ |

The activity level associated with the content originator 106, the domain being resolved, or the specific content object requested can be determined by the POP DNS server 340 based upon the number of content object requests, amount of bandwidth, number of content objects, or other metrics. Activity level for a domain on a particular content server 308 is used in this embodiment, but other embodiments could determine activity for a content originator or content object also. The granularity of the activity level could be per software service(s), hardware component(s), server(s), or pop(s) in various embodiments.

Resource utilization can be measured by the content server 308 and reported to the POP DNS server 340 periodically or if a threshold is crossed. For example, resources such as CPU utilization, disk input/output, memory utilization, number of connections, number of requests or other metrics can be monitored and reported; these metrics can be used by the POP DNS server 340 in determining whether the content server 308 is operating properly or operating poorly; alternatively, or additionally, the POP DNS server 340 can monitor each content server's 308 availability and health by simulating a content object request and measuring the server's response time to determine if the server is operating properly. Table II shows how the POP DNS server 340 could reallocate content servers after a content server 308 $y_5$ is removed from the future DNS solutions after the POP DNS server 340 has determined that the content server 308 $y_5$ is no longer available or operating properly.

In this example, other content servers 308 are allocated to replace $y_5$ 308 in a staggered manner such that content server 308 $y_5$ is not replaced by a single (i.e., the same) content server 308 in every allocation in which it had formerly appeared. In this embodiment, the FOO.iq and USPPC.gov domains lose one content server 308 from their allocation when $y_5$ goes down. Other embodiments could allocate another content server 308 from another POP 204 such that the number of content servers 308 in the allocation remains unchanged, but with the result that potentially some of the content requests of some recipient computers 128 are serviced entirely or in part by a content server 308 located in another POP 204.

TABLE II

Server Allocation Example After Deallocation of $y_5$

| Domain | Allocated Servers |
|---|---|
| ACME.org | $y_1, y_2, y_3, y_4$ |
| ABC.eu | $y_3, y_4, y_6, y_7$ |
| XYZ.com | $y_1, y_6, y_7, y_8, y_9, y_{10}, y_{11}, y_{12}$ |
| AAA.tv | $y_7, y_8, y_9, y_{10}$ |
| ZZZZZ.in | $y_9, y_{10}, y_{11}, y_{12}$ |
| FOO.iq | $y_1, y_2, y_3, y_4, y_6, y_7, y_8, y_9, y_{10}, y_{11}, y_{12}$ |
| AQME.com | $y_1, y_2, y_3, y_4$ |
| AABBCC.cn | $y_1, y_2, y_3, y_4, y_6, y_7, y_8, y_9$ |
| JONSMITH.net | $y_6, y_7, y_8, y_9$ |
| FOOFOO.org | $y_7, y_8, y_9, y_{10}$ |
| EXAMPLE.biz | $y_1, y_2, y_{11}, y_{12}$ |
| USPPC.gov | $y_1, y_2, y_3, y_4, y_6, y_7, y_8, y_9, y_{10}, y_{11}, y_{12}$ |

When a new content server 308 is added to DNS solutions for a particular domain, that new server 308 may be moved to being the first listed address in the DNS solutions for a period of time, to load up the content server 308 with content and/or activity for that domain. The POP DNS 340 can stop favoring the new content server 308 after under a load commensurate with other content servers 308.

From the viewpoint of a particular content server 308, it can be included in any number of DNS solution functions performed by the POP DNS server 340. For example, server $y_2$ is allocated to resolution request processes for the ACME.org, FOO.iq, AQME.com, AABBCC.cn, EXAMPLE.biz, and USPPC.gov domains. Each domain has its own DNS solution function that is varying DNS solutions per domain. That is to say, a resolution request to any of these domains may or may not include $y_2$ at the top of the list. Further, any number of different files of different sizes may be associated with each of the allocated domains. In this way, a particular content server 308, $y_2$, is included in any number of DNS solution functions for different domains in varying orders. This can unpredictably spread the object requests among a group of content servers 308.

A particular content server 308 can be taken offline in a permanent or temporary manner. Permanent removal may be caused by a failure of the content server 308 that may be repaired and brought online at another time. Temporary removal may be preferable when the content server 308 has not failed outright, but rather is operating poorly and may return to operating properly in time. For example, if the POP DNS server 340 has used a memory utilization measurement reported by the content server 308 to conclude that the content server 308 is no longer operating properly, that memory utilization level may drop in time as the process(es) causing the abnormally high memory utilization is(are) terminated by the operating system, terminated by an application or program, or end naturally. When temporary removal is caused by a utilization measurement exceeding a first threshold, an equal or lower second threshold is used to determine when to start using the content server 308 again in DNS solutions in this embodiment. Use of two thresholds, with the second threshold lower than the first, prevents utilization from oscillating around a single threshold that would cycle between an additional number of servers being included in new DNS solutions and then not included.

The DNS solution can be varied from one domain resolution request to the next such that various ISPs 132 receive a different ordered list of content servers 308. The DNS solutions may be varied in a round robin or random fashion such that the first content server 308 is likely to be different. For example, resolving AQME.com may result in a first solution, $s_1$, of $y_1, y_2, y_3, y_4$ and a second solution, $s_2$, of $y_2, y_3, y_4, y_1$, where the difference is a circular shift or round robin. In another example, $s_1 = y_4, y_2, y_3, y_1$ and $s_2 = y_1, y_3, y_4, y_2$ such that solutions vary in a random, pseudorandom or unpredictable manner.

As mentioned above, the number of server addresses can be limited in a solution, i.e., $x<y$. In various embodiments, x may equal 32, 16, 8, or 4. Referring back to Table I, the domain FOO.iq has twelve possible content servers 308 to choose from, but in this example, the solution size is limited to five. For each DNS solution, five of the twelve possible content servers 308 are chosen for inclusion in a random or round-robin fashion. For example, $s_1 = y_1, y_2, y_3, y_4, y_5$ and $s_2 = y_2, y_3, y_4, y_5, y_6$, could be chosen in a way that varies in a round-robin fashion.

Some embodiments take into account the processing power for the content servers 308 in allocating and reallocating them to a particular domain(s). The DNS solution may allocate more or less content servers based upon their ability to serve requests. For example, a first content server may have a single processor capable of serving one million requests per hour, and a second content server may have dual processors capable of serving two million requests per hour. In any event, these embodiments take some figure(s) of merit to estimate processing power and allocate servers based upon the figure(s) of merit. In Table IIIa, the actual servers are translated to equivalent servers using a function of the number of processors and/or processor cores. The function here is that the first processor is equivalent to a server, but each additional processor only adds a half server. For example, a two-processor computer would equal one and one-half equivalent servers. The embodiment of Table IIIa allocates the servers according to Table IV.

TABLE IIIa

Server Processing Power

| Server | Processors | Equivalent Servers |
|---|---|---|
| $y_1$ | 1 | 1 |
| $y_2$ | 2 | 1.5 |
| $y_3$ | 2 | 1.5 |
| $y_4$ | 4 | 2.5 |
| $y_5$ | 2 | 1.5 |
| $y_6$ | 1 | 1 |
| $y_7$ | 1 | 1 |
| $y_8$ | 1 | 1 |
| $y_9$ | 8 | 4.5 |
| $y_{10}$ | 1 | 1 |
| $y_{11}$ | 4 | 2.5 |
| $y_{12}$ | 6 | 3.5 |

There are any number of ways to determine how particular servers translate into a number of equivalent servers. The embodiment of Table IIIb tests each server or monitors its activity during normal use to determine the number of transactions that can be processed over a given time period. The ability to handle transactions correlates to the number of equivalent servers. For example, the number of equivalent servers is equal to the number of times that 10,000 transactions that can be handled in a second. The embodiment of Table IIIc uses a number of factors that characterize the server to find the number of equivalent servers, for example, number of processors, amount of memory, number of encoders, processor speed.

TABLE IIIb

Server Processing Power

| Server | Transactions | Equivalent Servers |
|---|---|---|
| $y_1$ | 12,000 | 1.2 |
| $y_2$ | 21,000 | 2.1 |
| $y_3$ | 24,000 | 2.4 |
| $y_4$ | 39,000 | 3.9 |
| $y_5$ | 20,000 | 2.0 |
| $y_6$ | 8,000 | 0.8 |
| $y_7$ | 17,000 | 1.7 |
| $y_8$ | 12,000 | 1.2 |
| $y_9$ | 80,000 | 8.0 |
| $y_{10}$ | 11,000 | 1.1 |
| $y_{11}$ | 43,000 | 4.3 |
| $y_{12}$ | 35,000 | 3.5 |

The determination of which servers in a DNS solution can be simplified in some embodiments. For example, the DNS solution could use 16 servers where half are multi-processor and half are single-processor. Should one of the servers become unavailable or begin operating poorly, another server of the same type would be chosen to replace it, for example, a dual-processor server would be replaced with another dual-processor. The replacement server(s) are chosen to generally match the processing power of the unavailable or poorly operating server. For example, the equivalent servers of the unavailable or poorly operating server may equal 1.5, but the replacement server may be ranked at 1.7 equivalent servers. Some embodiments randomly select servers of different configurations, and randomly pick a replacement when one becomes unavailable. In another embodiment, each DNS solution might include a minimum of one type of server, for example, the DNS solution would include at least four dual-processor servers that have at least one encoder.

TABLE IIIc

Server Processing Power

| Server | Processors | Speed | Memory | Encoders | Equivalent Servers |
|---|---|---|---|---|---|
| $y_1$ | 1 | 2 GHz | 1 GB | 0 | 1.2 |
| $y_2$ | 2 | 1 GHz | 4 GB | 4 | 2.4 |
| $y_3$ | 2 | 1 GHz | 2 GB | 3 | 2.4 |
| $y_4$ | 4 | 2 GHz | 8 GB | 2 | 3.9 |
| $y_5$ | 2 | 5 GHz | 2 GB | 2 | 2.0 |
| $y_6$ | 1 | 4 GHz | 1 GB | 2 | 1.1 |
| $y_7$ | 1 | 2 GHz | 1 GB | 2 | 1.5 |
| $y_8$ | 1 | 2 GHz | 2 GB | 4 | 1.5 |
| $y_9$ | 8 | 3 GHz | 7 GB | 3 | 8.0 |
| $y_{10}$ | 1 | 4 GHz | 1 GB | 1 | 1.5 |
| $y_{11}$ | 4 | 2 GHz | 5 GB | 5 | 4.3 |
| $y_{12}$ | 6 | 1 GHz | 8 GB | 8 | 3.5 |

TABLE IV

Server Allocation Based Upon Processing Power

| Domain | Equivalent Servers | Allocated Servers |
|---|---|---|
| ACME.org | 4 | $y_1, y_2, y_3$ |
| ABC.eu | 4 | $y_2, y_3, y_6$ |
| XYZ.com | 8 | $y_3, y_4, y_5, y_{11}$ |
| AAA.tv | 4 | $y_4, y_5$ |
| ZZZZZ.in | 4 | $y_5, y_{11}$ |
| FOO.iq | 12 | $y_6, y_7, y_8, y_9, y_{10}, y_{11}, y_1$ |
| AQME.com | 4 | $y_7, y_8, y_{10}, y_1$ |
| AABBCC.cn | 8 | $y_8, y_9, y_{11}$ |
| JONSMITH.net | 4 | $y_{10}, y_2, y_3$ |
| FOOFOO.org | 4 | $y_{11}, y_2$ |
| EXAMPLE.biz | 4 | $y_1, y_2, y_3$ |
| USPPC.gov | 12 | $y_9, y_{12}, y_1, y_2, y_3, y_6, y_7$ |

Figure 4A:
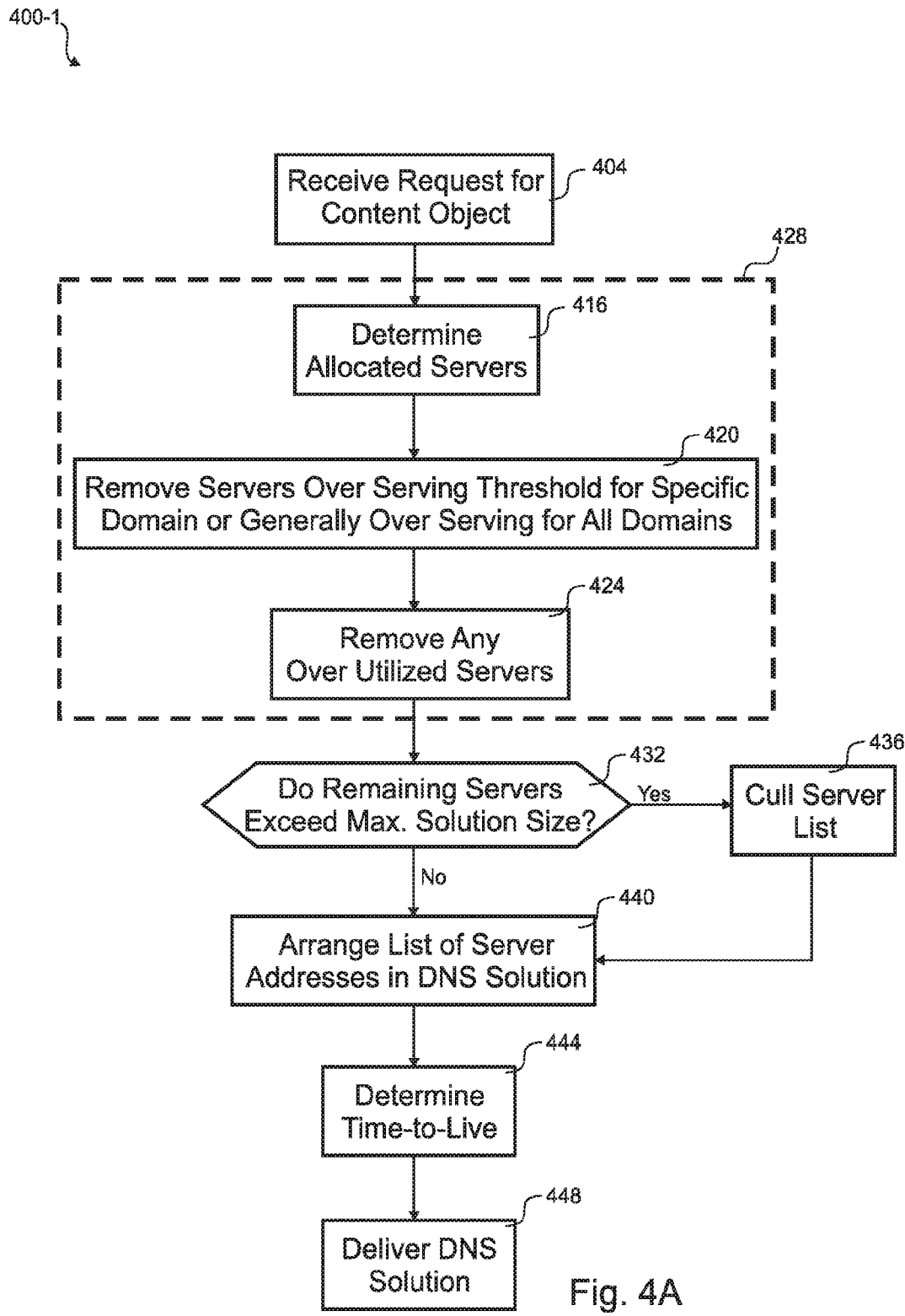
FIGS. 4A-4B are flow diagrams for embodiments of a process for issuing a domain name service (DNS) solution.

Referring next to FIG. 4A, a flow diagram of an embodiment of a process 400-1 for issuing a DNS solution is shown. The depicted portion of the process 400-1 begins in step 404 where the POP 204 receives a request to resolve a domain. The POP DNS 340 does analysis on the request, the recipient computer and ISP locations and possibly, the other POPs 204 before indicating which servers should be included in the DNS solution.

A step 428, which includes sub-steps 416, 420 and 424, is performed next. In sub-step 416, the y server addresses that are allocated to the requested domain are determined. This may be done by simply counting servers or by counting equivalent servers. When counting equivalent servers, the processing power may not match exactly, but it generally matches in one embodiment. Any servers 308 determined to be unavailable are removed from the list of possible servers in sub-step 420. In sub-step 424, servers 308 that are determined to be operating poorly are also removed from the list of possible servers. Replacements for the removed servers may be randomly chosen or chosen to match the processing power of the removed server. Upon completion of step 428, the set of possible servers that could be used in a DNS solution are known.

In step 432, a determination is made to see if the number of possible servers exceeds the solution limit, i.e., is y<x? If that is the case, the set of possible servers is reduced in step 436 in a manner where different servers are culled over time. Where the limit is not exceeded in step 432 or after culling occurs in step 436, the list of servers is arranged in a mixed-up or round-robin fashion in step 440. A time-to-live value is determined or retrieved for adding to the DNS solution in step 444. In step 448, the DNS solution is delivered to the DNS recursor.

Figure 4B:
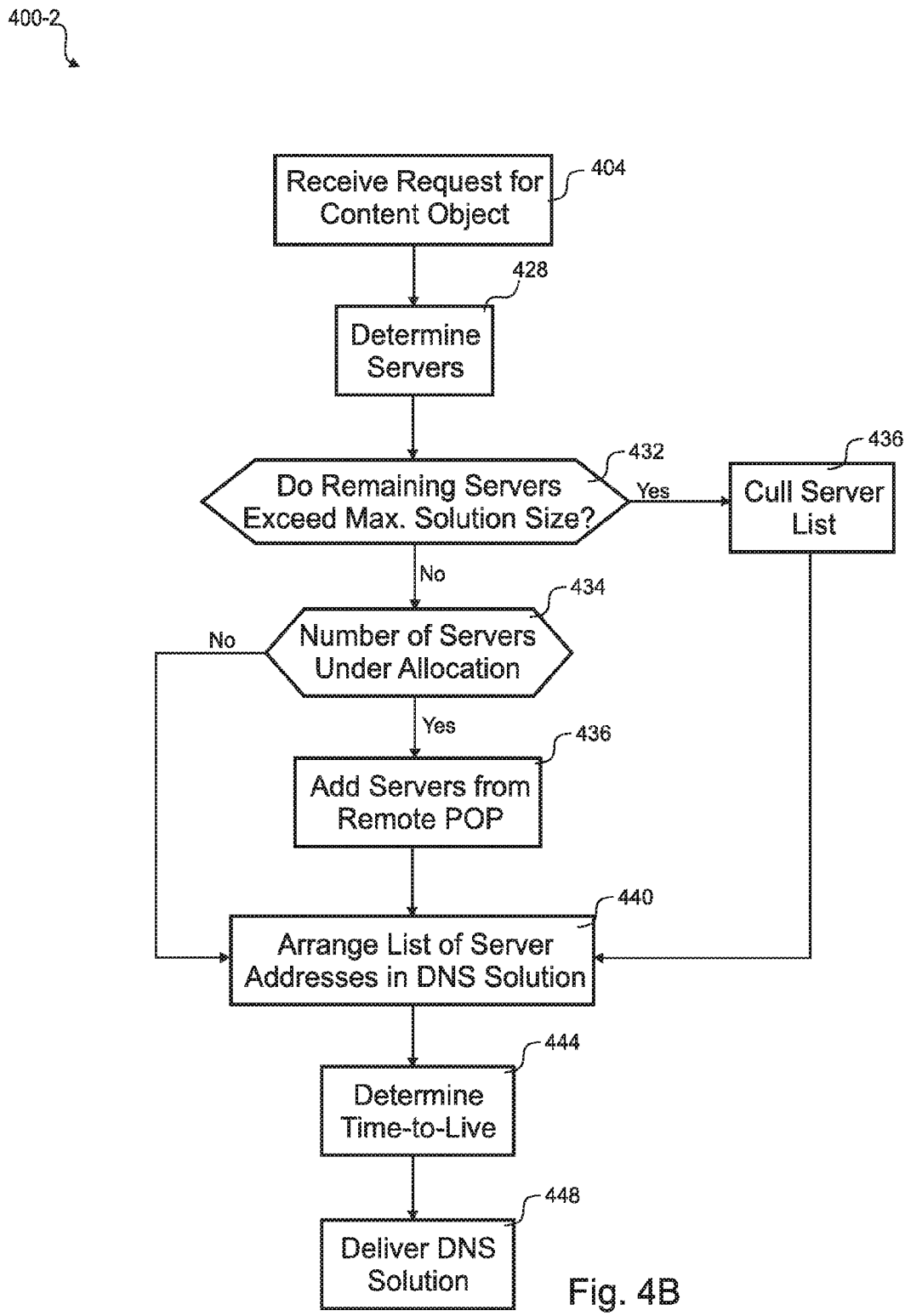

With reference to FIG. 4B, a flow diagram of another embodiment of a process 400-2 for issuing a DNS solution is shown. In comparison to the embodiment of FIG. 4A, this embodiment adds steps 434 and 436 between steps 432 and 440. If it is determined in step 432 that there are more possible servers in the set than afforded by the solution limit, processing goes to step 434 where a further determination is made to see if the number of servers in the set is less than the allocation for a particular domain. Where the allocation is complied with processing continues to step 440. In the alternative case, more servers are added from a remote POP 204. Those remote servers are added in step 436 to the list of possible servers before processing continues to step 440.

Figure 5:
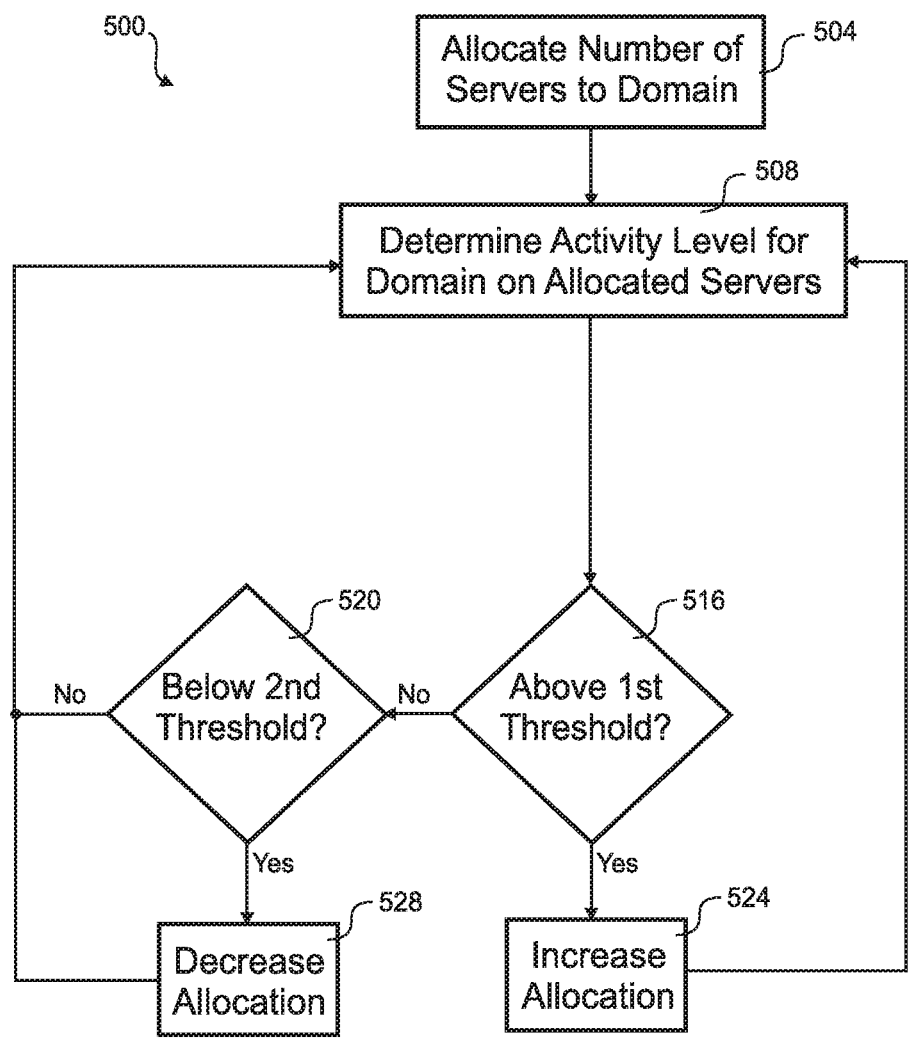
FIG. 5 is a flow diagram of an embodiment of a process for dynamically adjusting server allocation to a domain serviced by the CDN.

Referring next to FIG. 5 is a flow diagram of an embodiment of a process 500 for adjusting server allocation to a domain serviced by the CDN 110. The depicted portion of the process 500 begins in step 504 where an initial allocation is made for a set or list of servers 308 that can cache or store content objects for the domain. In step 508, the specific activity level for the domain across the allocated servers 308 is determined.

Where the activity level is above the first threshold, the allocation is increased in step 524. If the activity level was not above the first threshold in step 516, processing would continue to step 520 to determine if the activity level was below a second threshold. In the event that the activity level was below the second threshold, the allocation would be decreased in step 528.

Although some of the above embodiments talk in terms of reaching a specific activity level, before increasing content server 308 allocation or including content servers 308 from other POPs 204. These actions could be done far before the maximum activity level for a content server 308 or a POP 204 is reached. For example, inclusion of content servers 308 from other POPs 204 could begin at any threshold such as 30%, 40%, 50%, 60%, 70%, or 80% of the maximum activity level.

Some of the above block diagrams mention a server or block that performs a function. That server or block may be implemented with a single or multiple servers. Where multiple servers are used, they may be geographically spread out, but function as a single unit from some perspectives. For example, the POP DNS server 304 may be one server co-located with the POP 204, could be multiple servers located in the POP 204 or could be a geographically diverse set of servers accessible from the POP 204. As those skilled in the art appreciate, networks allow varied configurations while still implementing the same function.

Some of the embodiments are discussed in relation to CDNs, but the way DNS solutions are determined is applicable to any system that provides alternative addresses for a domain. The DNS solution with the alternative addresses could be provided by the content originator in cases where there is a captive CDN or no CDN at all.

While the principles of the disclosure have been described above in connection with specific apparatuses and methods, it is to be clearly understood that this description is made only by way of example and not as limitation on the scope of the invention.

What is claimed is:

1. A content delivery network (CDN) for delivering content over the Internet using a plurality of points of presence (PoPs), wherein the CDN is configured to deliver content for others, the CDN comprising:
   a domain resolution service (DNS) server, wherein:
      each of the plurality of PoPs includes a plurality of content servers;
      the DNS server is located in one of the PoPs;
      the DNS server generates a list of ones of the content servers that are considered available in the one of the PoPs;
      the DNS server is configured to receive a first domain resolution request at a first point in time, and produces a first DNS solution in response thereto, the first DNS solution including a first plurality of IP addresses of content servers that are considered available at the first point in time;
      the DNS server is configured to receive a second domain resolution request at a second point in time, and produces a second DNS solution in response thereto, the second DNS solution including a second plurality of content server IP addresses of content servers that are considered available at the second point in time; and
      the DNS server is configured to:
         receive one or more utilization measurements to assess an operating status of each of the content servers in the one of the PoPs,
         determine that a given one of the content servers should be removed from the list of servers considered available when its utilization measurement exceeds a first threshold, and
         determine that the given one of the content servers should be restored to the list of servers considered available when its utilization measurement is lower than a second threshold, the second threshold being lower than the first threshold.

2. The CDN for delivering content over the Internet as recited in claim 1, wherein the first and second domain resolution requests correspond to the same domain.

3. The CDN for delivering content over the Internet as recited in claim 1, wherein the first and second domain resolution requests correspond to differing domains.

4. The CDN for delivering content over the Internet as recited in claim 1, the second threshold being lower than the first threshold by an amount sufficient to introduce hysteresis into production of the DNS solutions such that, over time, utilization of the content servers in the one of the PoPs does not oscillate.

5. The CDN for delivering content over the Internet as recited in claim 1, wherein the one or more utilization measurements is based on one or more of CPU utilization, disk input/output, memory utilization, number of connections or number of requests.

6. The CDN for delivering content over the Internet as recited in claim 1, wherein the DNS server determines a number of content servers to be assigned in DNS solutions that is at least partially based on a number of content servers in the list of servers considered available.

7. The CDN for delivering content over the Internet as recited in claim 6, wherein the number of content servers to be assigned in DNS solutions is dynamically calculated in response to each domain resolution request.

8. The CDN for delivering content over the Internet as recited in claim 6, wherein the number of content servers to be assigned in DNS solutions is determined periodically and stored in a table for look-up at each domain resolution request.

9. The CDN for delivering content over the Internet as recited in claim 1, wherein:
   the first and second DNS solutions list common addresses in the first and second DNS solutions in a different order; and
   the different order varies in at least one of a mixed-up fashion, a round-robin fashion, or a random fashion.

10. The CDN for delivering content over the Internet as recited in claim 1, further comprising a wide area network coupling the plurality of caching servers together, wherein at least one of the PoPs is geographically remote from at least one other of the PoPs.

11. A method for delivering content over the Internet using a plurality of points of presence (PoPs) that are geographically distributed, wherein the method comprises:
   utilizing a DNS server of one of the PoPs to maintain a list of content servers that are considered available for domain resolution service (DNS) resolution requests for the one of the PoPs based on at least one utilization measurement of at least one of the content servers,
      wherein if the utilization measurement exceeds a first threshold, the at least one of the content servers is removed from the list of content servers that are considered available, and
      if the utilization measurement falls below a second threshold, the at least one of the content servers is added to the list of content servers that are considered available,
      the second threshold being lower than the first threshold;
   receiving a first domain resolution request at a first point in time, at the DNS server;
   producing a first DNS solution utilizing the DNS server, the first DNS solution corresponding to the first domain resolution request, and including a first plurality of IP addresses of content servers taken from the list of content servers that are considered available at the first point in time;
   returning the first DNS solution from the PoP;
   receiving a second domain resolution request at a second point in time, at the DNS server;
   producing a second DNS solution utilizing the DNS server, the second DNS solution corresponding to the second domain resolution request, and including a first plurality of IP addresses of content servers taken from the list of content servers that are considered available at the second point in time; and
   returning the second DNS solution from the PoP, the second DNS solution differing from the first DNS solution based on a difference in the list of content servers between the first and second points in time.

12. The CDN for delivering content over the Internet as recited in claim 11, wherein the first and second domain resolution requests correspond to the same domain.

13. The CDN for delivering content over the Internet as recited in claim 11, wherein the first and second domain resolution requests correspond to differing domains.

14. The method for delivering content over the Internet, as recited in claim 11, wherein the second threshold is lower than the first threshold by an amount sufficient to introduce hysteresis into production of the DNS solutions such that, over time, utilization of the content servers in the one of the PoPs does not oscillate.

15. The method for delivering content over the Internet, as recited in claim 11, wherein the one or more utilization measurements is based on one or more of CPU utilization, disk input/output, memory utilization, number of connections or number of requests.

16. The method for delivering content over the Internet, as recited in claim 11, further comprising determining a number of content servers to be assigned in DNS solutions that is at least partially based on a number of content servers in the list of servers considered available.

17. The method for delivering content over the Internet, as recited in claim 16, wherein determining the number of content servers occurs dynamically in response to each domain resolution request.

18. The method for delivering content over the Internet, as recited in claim 16, wherein determining the number of content servers occurs periodically, and further comprising storing the number in a table for look-up at each domain resolution request.

19. A non-transitory machine-readable medium having machine-executable instructions for performing the machine-implementable method for delivering content over the network of claim 11.

20. A point of presence (PoP) of a content delivery network (CDN) for delivering content over the Internet, the PoP comprising:
   a plurality of content servers; and
   a domain resolution service (DNS) server that is configured to:
      determine that a given one of the content servers should be removed from a list of content servers in the PoP that are considered available, when a utilization measurement of the given one of the content servers exceeds a first threshold;
      determine that the given one of the content servers should be restored to the list of servers considered available, when the utilization measurement of the given content server is lower than a second threshold, wherein the second threshold is lower than the first threshold; and
      produce a DNS solution, including a plurality of IP addresses of content servers, in response to a domain resolution request, each of the IP addresses corresponding to a content server included in the list of content servers that are considered available when the DNS solution is produced.

* * * * *

UNITED STATES PATENT AND TRADEMARK OFFICE
CERTIFICATE OF CORRECTION

PATENT NO. : 8,645,539 B2
APPLICATION NO. : 13/732819
DATED : February 4, 2014
INVENTOR(S) : Nils H. McCarthy et al.

It is certified that error appears in the above-identified patent and that said Letters Patent is hereby corrected as shown below:

In the Specification

Column 8, line 21, please delete "ally" and insert --all y--.

Signed and Sealed this
Sixteenth Day of September, 2014

Michelle K. Lee
*Deputy Director of the United States Patent and Trademark Office*